May 29, 1923. Re. 15,616

G. D. LUCE

CANE STRIPPER

Original Filed Jan. 5, 1911 6 Sheets-Sheet 1

WITNESSES:

Arthur Chaquet

P. Frank Dorsch

George D. Luce INVENTOR.

BY

G. E. Serwilliger ATTORNEY

May 29, 1923. Re. 15,616

G. D. LUCE

CANE STRIPPER

Original Filed Jan. 5, 1911 6 Sheets-Sheet 2

WITNESSES:

Arthur Choquet

V. Frank Drum

George D. Luce INVENTOR.

BY

G. E. Terwilliger ATTORNEY

May 29, 1923. Re. 15,616

G. D. LUCE

CANE STRIPPER

Original Filed Jan. 5, 1911 6 Sheets-Sheet 3

WITNESSES:
Arthur Chaquet
F. Frank Lamb

George D. Luce INVENTOR.
BY
G. E. Terwilliger ATTORNEY

May 29, 1923. Re. 15,616

G. D. LUCE

CANE STRIPPER

Original Filed Jan. 5, 1911 6 Sheets-Sheet 4

WITNESSES:

Arthur Choquet

P. Frank Connolly

George D. Luce INVENTOR.

BY

G. C. Tenwilliger ATTORNEY

May 29, 1923. Re. 15,616
G. D. LUCE
CANE STRIPPER
Original Filed Jan. 5, 1911 6 Sheets-Sheet 5
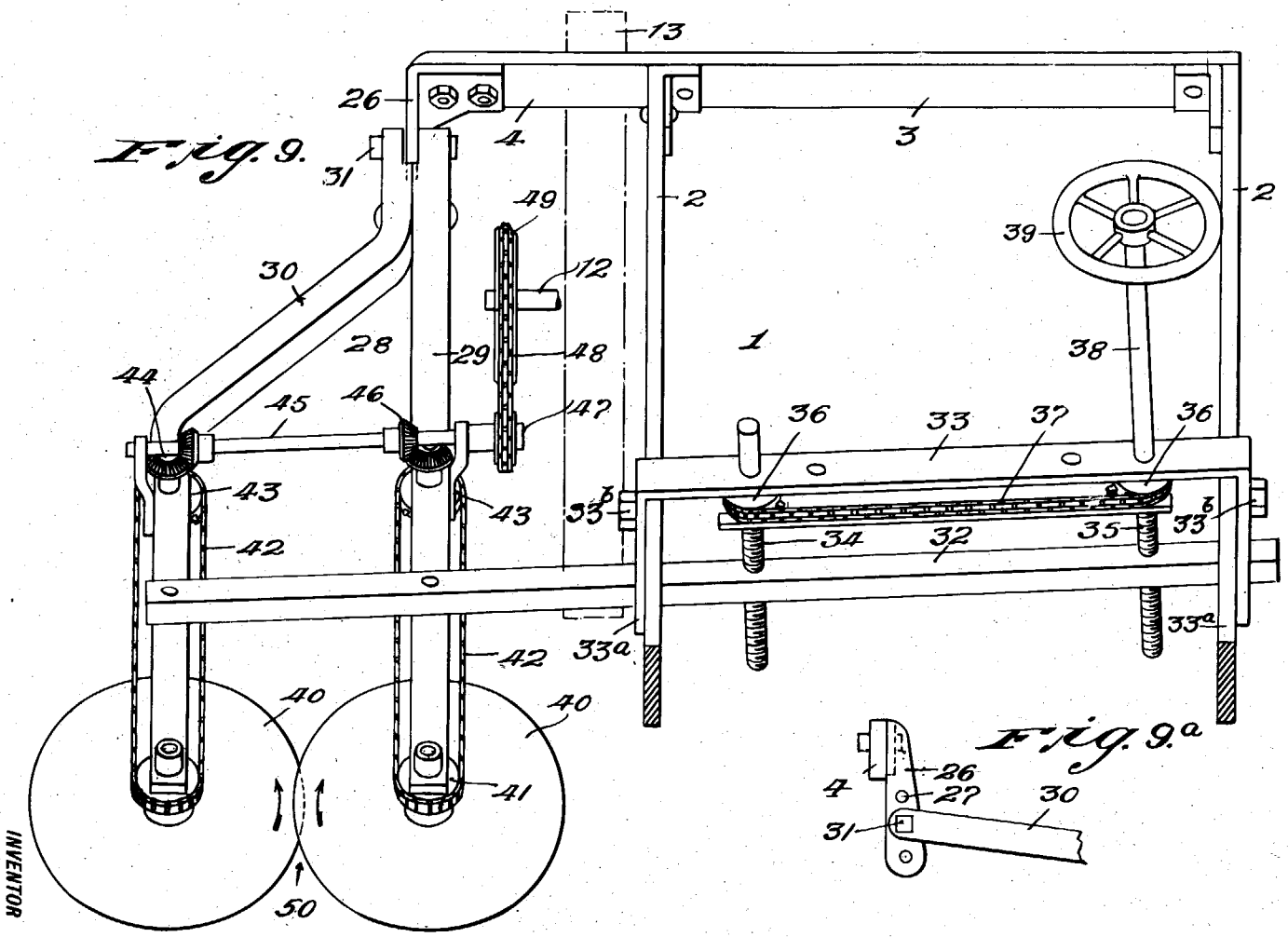
INVENTOR
George D. Luce
BY William P. Hammond
and
Edward Quincy Moore
ATTORNEYS May 29, 1923. Re. 15,616

G. D. LUCE

CANE STRIPPER

Original Filed Jan. 5, 1911 6 Sheets-Sheet 6

INVENTOR

George D. Luce

BY William P. Hammond and Edmund Quincy Grosse

ATTORNEYS

Reissued May 29, 1923. Re. 15,616

UNITED STATES PATENT OFFICE.

GEORGE D. LUCE, OF NEW ORLEANS, LOUISIANA, ASSIGNOR TO LUCE CANE HARVESTER CORPORATION, OF NEW YORK, N. Y., A CORPORATION OF DELAWARE.

CANE STRIPPER.

Original No. 1,053,917, dated February 18, 1913, Serial No. 600,917, filed January 5, 1911. Application for reissue filed February 17, 1915. Serial No. 8,940.

*To all whom it may concern:*

Be it known that I, GEORGE D. LUCE, a citizen of the United States, and a resident of New Orleans, in the parish of Orleans and State of Louisiana, have invented a new and Improved Cane Stripper, of which the following is a full, clear, and exact description.

This invention relates to sugar cane harvesters, and the object of the invention is to produce a machine which can be advanced along the rows of cane, and which will operate to top the stalks of cane and strip the leaves from the stalks.

The invention concerns itself, further, with providing means for raising the stalks which are not erect, and for advancing the stalks through the machine while being operated upon by the topping knife and the brushes, which remove the leaves from the stalks.

The invention consists in the construction and combination of parts to be more fully described hereinafter and particularly set forth in the claims.

Reference is to be had to the accompanying drawings forming a part of this specification, in which similar characters of reference indicate corresponding parts in all the figures.

Figures 1, 8:
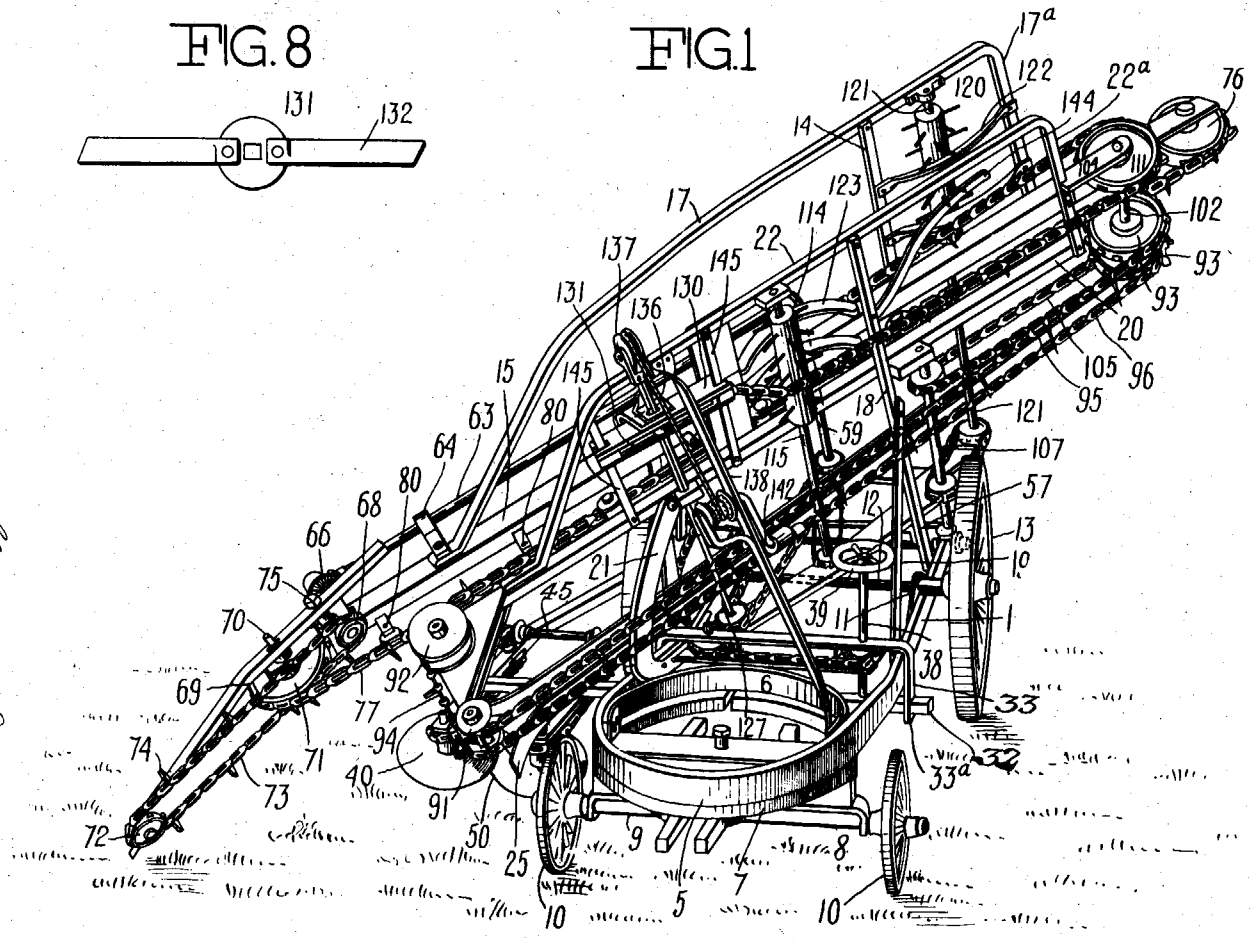
Figure 2:
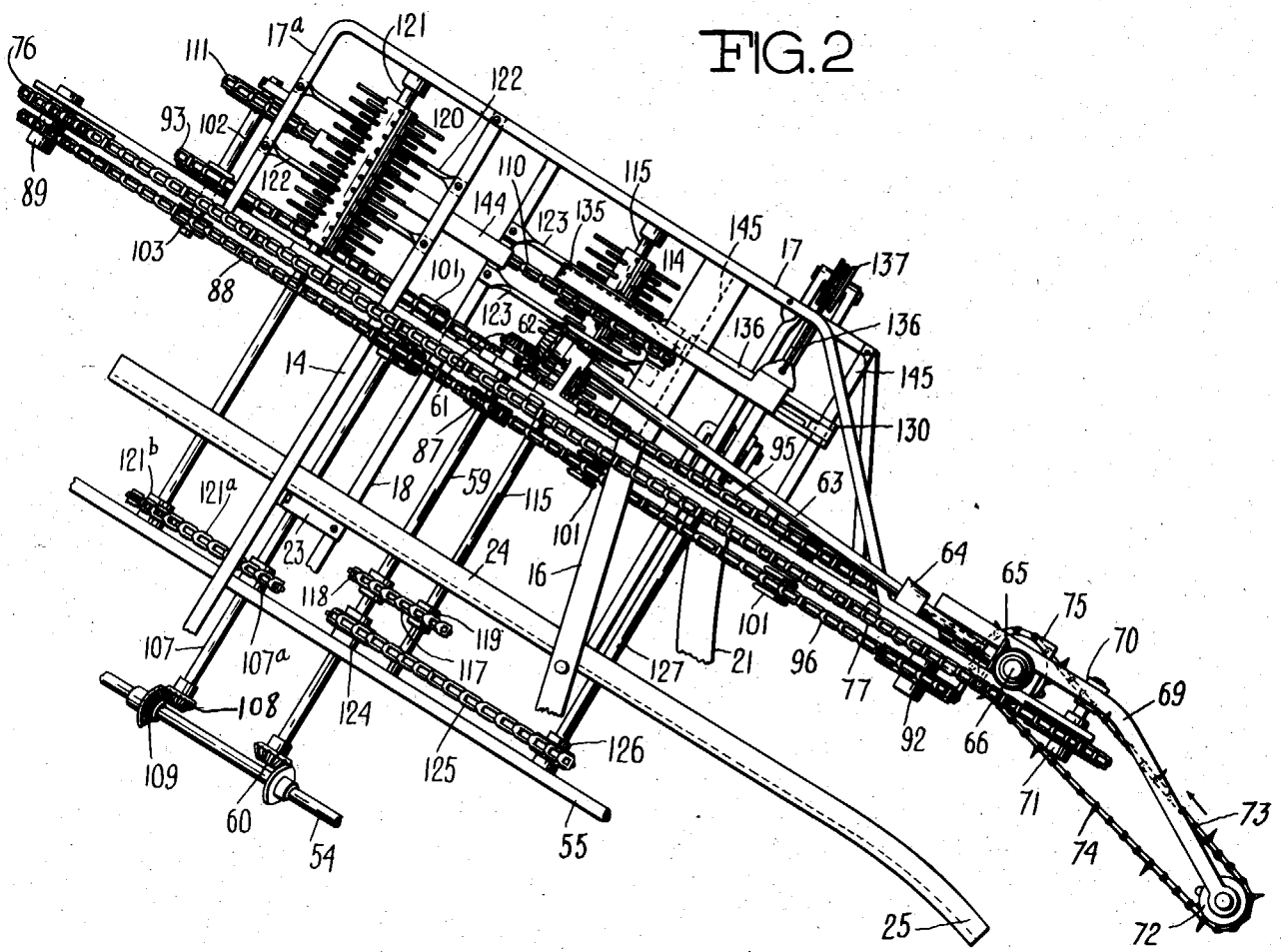
Figure 4:
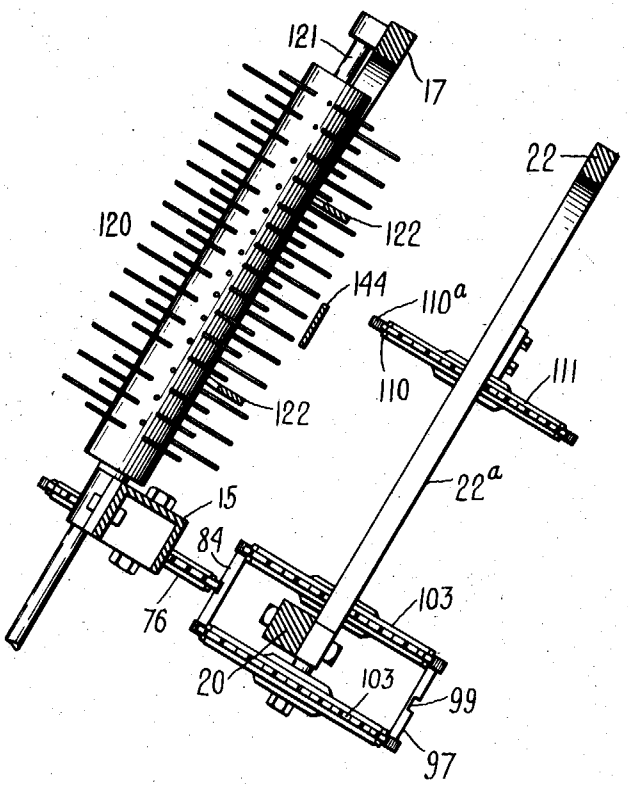
Figure 3:
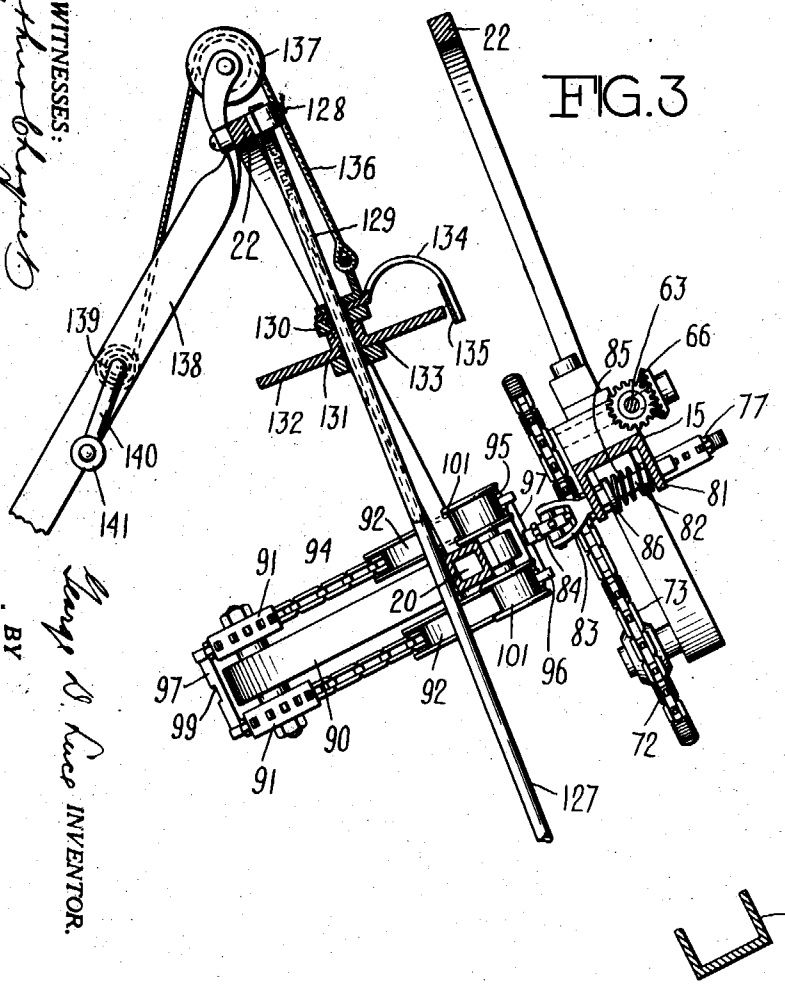
Figure 5:
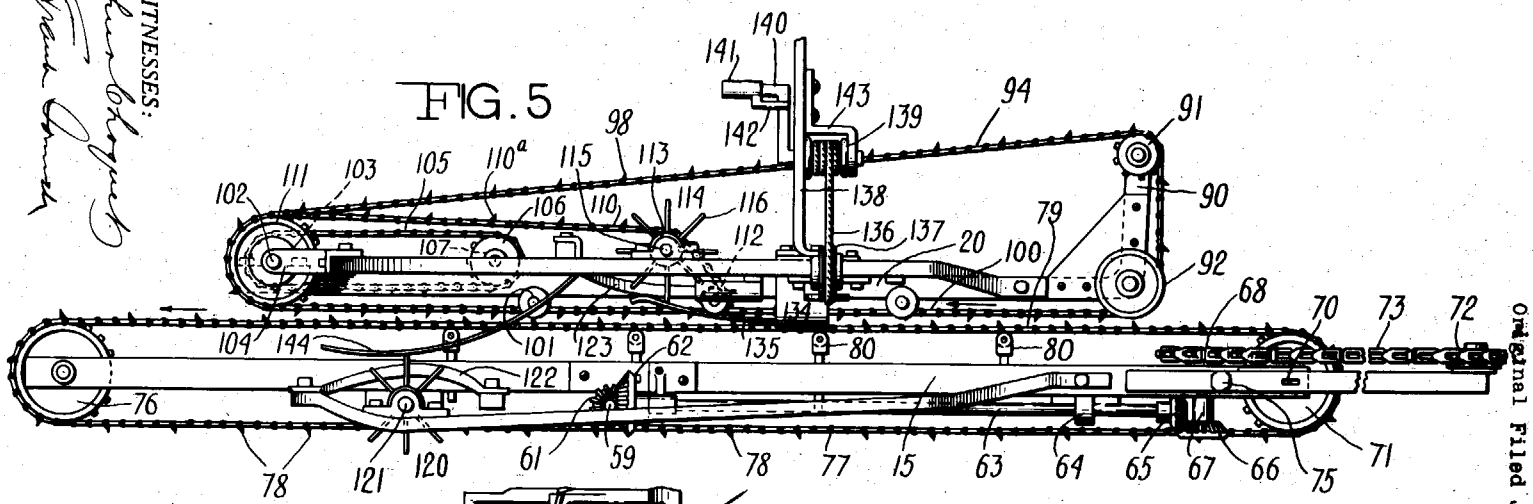
Figure 7:
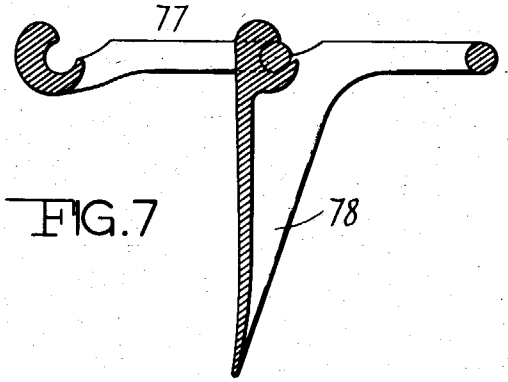
Figure 6:
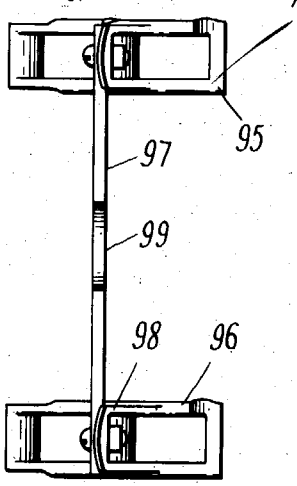

Figure 1 is a perspective of the machine constructed according to my invention, and viewed from the front; Fig. 2 is a rear elevation of a part of the mechanism of the machine projected upon a plane parallel with the plane in which the stalks are guided in passing through the machine; Fig. 3 is a section at right angles to the path of movement of the cane through the machine in the vicinity of the topping knife, and illustrating the manner in which the stalks are guided through the machine and presented to the topping knife which cuts off the upper ends of the stalks; this view also illustrates the means for regulating the height of the topping knife; this section is taken at a point just to the right of the topping knife as viewed in Fig. 1, looking toward the left of the figure; Fig. 4 is a section taken transversely of the guide frames like Fig. 3, but looking in the opposite direction; this view is taken near the right hand part of Fig. 1 and looking toward the right; it illustrates especially the arrangement for presenting the stalks to the brushes when removing the leaves therefrom; Fig. 5 is a view looking down on the machine and projected upon a plane parallel with the path of movement of the conveyer chains which advance the stalks through the machine; Fig. 6 is a side elevation showing two opposite links of parallel chains which are used in the advancing mechanism for the stalks, and illustrating especially the manner in which the two parallel chains are connected; this view is upon an enlarged scale; Fig. 7 is a vertical section through two adjacent links and illustrating the construction of the conveyer chains used in the machine; this view is upon an enlarged scale; Fig. 8 is a detail plan showing the knives or cutters which cut off the tops of the stalks of cane; Fig. 9 is a perspective view, illustrating especially the rear frame work of the machine and the cutting mechanism and the means for raising and lowering the cutters; Fig. 9A is a side elevation showing in detail the means for supporting the rear end of the cutter frame; and Fig. 10 is a plan view of the rear portion of the machine, illustrating especially the means for driving the different shafts which run the machinery.

Figure 10:
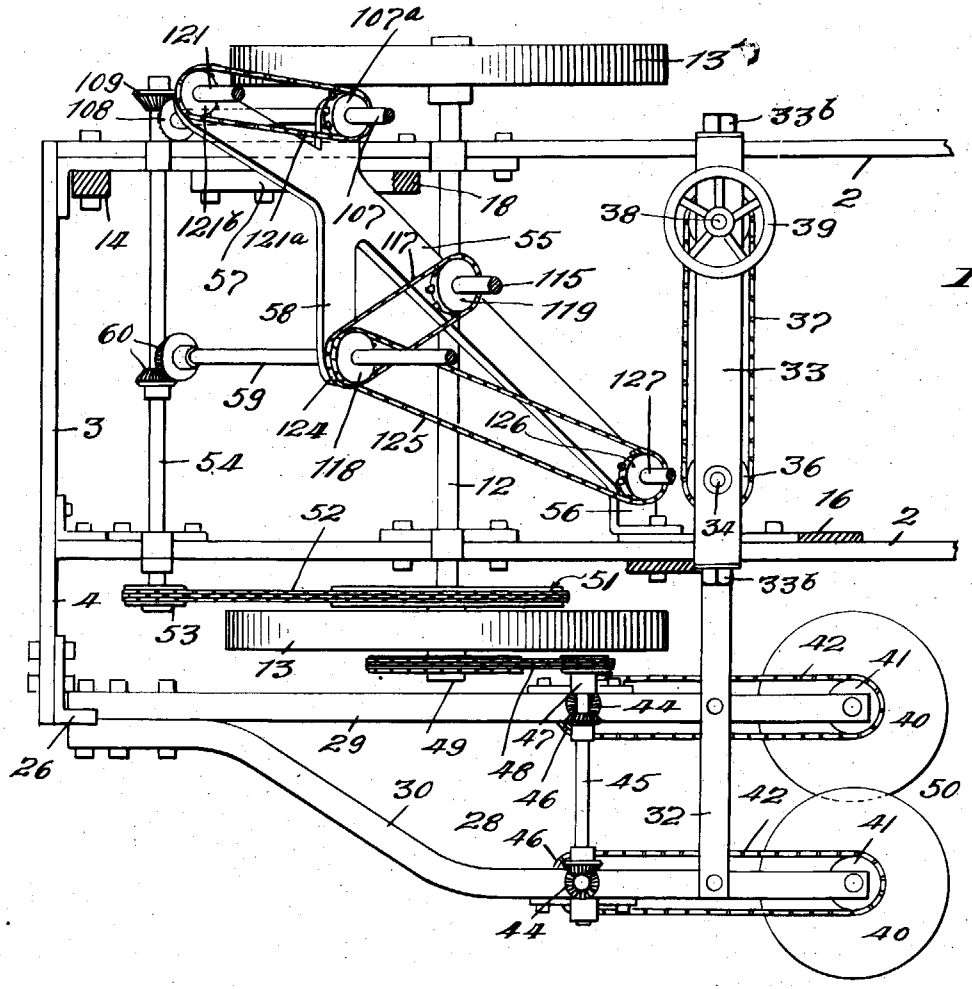

Referring more particularly to the parts and especially to Figs. 1 and 10, 1 represents the truck of the machine, which is a substantially rectangular frame, as shown, presenting parallel side bars 2 and a rear bar 3, said rear bar having an extension or arm 4 which projects beyond the side of the truck frame for a purpose which will appear more fully hereinafter. The side bars 2, 2 are united integrally at the forward end of the machine by an arc 5, and at the point where this arc 5 joins the straight portions of the side bars 2, the ends of a semi-circular bow 6 are rigidly attached. This bow 6, together with the arc 5, forms a bearing of substantially circular form, which is supported upon a fifth wheel 7 which is rigidly attached to the forward truck 8 of the machine. The forward truck 8 includes the axle 9 carrying forward wheels 10, and to the forward truck a tongue or any other suitable means is attached, which enables the vehicle to be drawn along by draft animals. The side bars 2 are provided at suitable points with brackets 11, which afford means for mounting the rear axle 12, the said rear axle carrying the rear wheels 13, as shown. Near the rear portion of the frame 1 and at the left side thereof, there is attached rigidly to the side bar, a rear stanchion 14. This stanchion extends upwardly and inclines toward the front of the machine. At an intermediate point on the body of this stanchion there is rigidly attached a main guide bar 15, which extends across the machine in an inclined direction, so that the lower end of the bar projects downwardly at the right of the machine, as illustrated in Fig. 1. The forward portion of this main guide bar is supported upon a brace 16 attached to the side bar 2 at the right of the frame. Above the main guide bar 15 an auxiliary bar 17 is attached. The body of this bar is disposed substantially parallel with the bar 15, the forward and lower end being inclined downwardly and attached rigidly to the upper face of the bar 15, as illustrated in Fig. 1. The rear end of the bar 17 is bent at right angles to the body thereof, forming an end bar 17[a], and is attached to the guide bar, as will be readily understood. The bar 15, together with the bar 17 and contiguous parts, constitute a main guide frame for guiding the stalks in their passage through the machine, as will appear hereinafter. The body of the bar 17 is attached to the upper end of the main stanchion 14. On the left side of the frame 1, forward of the stanchion 14, a forward stanchion 18 is rigidly attached, and this stanchion, extends upwardly and forwardly in an inclined position and substantially parallel with the stanchion 14; it is held securely in position by means of an inclined brace 19, which connects it at an intermediate point upon its length with the side bar of the frame to which it is attached. To the upper portion of this forward stanchion 18, and at an intermediate point thereof, an auxiliary guide bar 20 is attached. This guide bar is disposed parallel with the main guide bar 15, and a short distance therefrom, so that a guide space for the stalks of cane is formed between the two bars. The forward end and lowed end of this auxiliary guide bar 20 is held securely in position by means of a brace 21 which is rigidly secured to the side bar 2 at the right-hand side of the machine. Above the auxiliary guide bar 20 a frame bar 22 is provided which is similar to the bar 17, its body being disposed parallel with the auxiliary bar, having an nclined extension disposed forwardly, which is attached to the auxiliary guide bar as shown. The rear end of the bar 22 is formed into an end bar 22[a] which extends at right angles to the body thereof, and is secured to the guide bar 20 as shown. The upper end of the stanchion 18 attaches to the body of the bar 22. The auxiliary guide bar 20, together with the frame bar 22 and contiguous parts, constitute an auxiliary guide frame for guiding the stalks of cane as they pass through the machine. The stanchions 14 and 18 are rigidly connected together by a cross brace 23, as illustrated most clearly in Fig. 2. Upon this cross brace 23 there rests a guide channel, chute or gutter 24. This channel is disposed in an inclined position at a lower level than the guide bars 15 and 20; its lower end projects slightly at the right of the machine, and is opened out so as to form an expanded mouth 25 which receives the lower ends of the stalks, after being cut off, in a manner which will now be described.

Referring especially to Figs. 9, 9[A] and 10, to the end of the extension 4 at the right of the frame 1, a bracket 26 is attached, which bracket extends downwardly and is provided with a plurality of openings or holes 27, for supporting the rear end of the cutter frame 28. This cutter frame comprises a straight or main arm 29 and an auxiliary or offset arm 30, the two arms being attached together at their rear ends and connected by a pivot bolt 31 which passes through one of the openings 27 to support the frame as indicated. To the forward ends of the arms 29 and 30 a hanger bar 32 is rigidly attached and the body of this bar extends under the frame 1 of the machine in a horizontal position. Adjacent to the hanger bar 32 the frame 1 is provided with a cross bar or hanger 33. In this hanger 33 rotatable adjusting screws 34 and 35 are mounted, the said screws being provided with sprocket wheels 36 which are connected by a chain 37. The screw 35 is extended upwardly to form a spindle 38 surmounted by a hand wheel 39 for rotating the adjusting screws in unison, as will be readily understood. These screws 34 and 35 have a threaded connection with the bar 32 which they support. Evidently from this arrangement, by rotating the hand wheel 39, the forward end of the cutter frame 28 may be raised or lowered to adjust the same, as desired. The rear end of the cutter frame may be adjusted by means of the pivot bolt 31 in the openings 27. The hanger 33 is formed with integral downwardly extending side arms 33[a] which are forked so as to guide the bar 32. These arms are pivotally attached to the side bars 2 by the bolts 33[b] as shown.

At the forward end of each of the arms 29 and 30, cutters or cutter disks 40 are provided, which are disposed adjacent to each other, with their edges overlapping in a well understood manner. These cutters are rotatably mounted to the under sides of the outer ends of the arms, and are provided with sprocket wheels 41 which enable them to be driven by sprocket chains 42, the said chains passing rearwardly under the arms and passing around rear sprocket wheels 43. Rigid with these sprocket wheels 43 bevel gear wheels 44 are provided, which are driven by means of a cross shaft 45 and bevel gears 46. This shaft 45 projects at its inner end and carries rigidly secured thereto a sprocket wheel 47, which enables it to be driven by a sprocket chain 48 running over a driving sprocket wheel 49, the latter sprocket wheel being carried rigidly upon the shaft 12 to which is rigidly secured one of the rear wheels 13, as illustrated in Figure 10. From this arrangement it should be understood that as the machine advances, the cutters 40 will be rotated continuously, so that if the stalks of cane pass into the angle or throat 50 formed between the cutters, they will be cut off.

I shall now describe the means for advancing or feeding cut stalks of cane to the machine, referring especially to Figs. 2 and 5. The rear axle 12 is provided, at the right of the frame, with a large sprocket wheel 51 from which a sprocket chain 52 extends rearwardly, passing around a sprocket wheel 53 carried on a countershaft 54 mounted transversely at the rear of the frame, as shown. In the rear portion of the frame in the vicinity of this point, a special shaft frame or bearing frame 55 is supported in an inclined position, the forward end being attached to a forward bracket 56 attached to the right-hand side bar 2. The rear portion of the frame 55 is supported upon a bracket 57 attached to the forward stanchion 18. The shaft frame 55 is formed with an arm 58, which constitutes a bearing for a main driving shaft 59. This shaft extends upwardly in an inclined direction, being driven from bevel gears 60 at the countershaft 54. The upper end of the driving shaft 59 is provided with a bevel gear wheel 61, and this bevel gear meshes with a corresponding bevel gear wheel 62 which is carried upon a line shaft 63. This shaft 63 extends longitudinally of the main guide-bar 15 aforesaid, being rotatably mounted thereupon in suitable brackets 64; its lower end is provided with a bevel gear wheel 65 which drives a corresponding bevel gear wheel 66 mounted on a stub shaft 67, the said stub shaft having a rigid sprocket wheel 68 on the forward face of the guide bar. Adjacent to this point the main guide bar 15 is provided with an extension bar 69, as illustrated in Fig. 2. The upper portion of this bar is disposed substantially parallel with the forward end of the guide bar 15, but its forward portion extends downwardly in an inclined direction; it is mounted adjustably upon an adjusting screw 70 in the end of the bar 15, the said screw constituting a pivot for a sprocket wheel 71, the purpose of which will appear more fully hereinafter.

The lower end of the extension bar 69 is provided with a sprocket wheel 72, around which extends a sprocket chain 73, the said chain being provided with projecting dogs 74. The extension bar 69 constitutes a nose which projects itself under the stalks of cane which may be not in an erect position, and raises the stalks so that they will pass through the throat 50 between the cutters 40 to be cut off thereby. The direction of movement of the chain is that indicated by the arrow in Fig. 2. The body of the extension bar 69 is mounted, near the adjusting screw 70, upon a post 75, to which it is adjustably attached in any suitable manner. In this way the elevation of the lower end of the extension bar may be adjusted with respect to the ground level.

Opposite to the sprocket wheel 71 referred to above, and at the upper end of the main guide bar 15, a similar sprocket wheel 76 is provided, and around these sprocket wheels an endless chain 77 passes. This chain constitutes the main feed chain, and is provided at intervals with dogs 78 formed integrally from the links thereof, as illustrated in Fig. 7. These dogs project outwardly from the guide bar 15, so that they project across the space between this guide bar and the guide bar 20, as illustrated most clearly in Fig. 5. The driving side 79 of the chain 77, that is, the side toward the guide bar 20, is held off from the guide bar 15 by means of a plurality of arms 80. In Fig. 5 I have illustrated four of these arms; the details of the construction of these arms are illustrated in Fig. 3. Referring to this figure, it will be observed that the guide frame 15 is formed of channel iron, and in the flanges 81 of the channel, stems 82 are slidably mounted, the said stems projecting from the bar at the side toward the auxiliary frame 20, at which point they are formed with bifurcated heads 83 carrying small sprocket wheels 84, as shown; these sprocket wheels 84 are engaged by the chain. Around the stems 82 I provide springs 85 which, at their forward ends, thrust against collars 86 on the stems 82, and tend to force the chain toward the opposite guide frame, as will be readily understood.

It will be observed from an inspection of Figs. 2 and 6 that the forward end of the chain 77 passes through the opening of the chain 73; that is, the chains 77 and 73 are looped through each other. In order to drive the chain 77, the main driving shaft 59 is provided, near its upper end, with a sprocket wheel 87 about which passes a sprocket chain 88. This chain passes to the upper and rear end of the main guide bar 15, where it passes around a sprocket wheel 89 which is rigid with the sprocket wheel 76 already described.

As indicated most clearly in Fig. 5, the forward end of the auxiliary guide bar 20 is formed with a laterally projecting arm 90, at the end of which a pair of sprocket wheels 91 are arranged. At the adjacent end of the guide bar sprocket wheels 92 are arranged, and similar sprocket wheels 93 are mounted at the opposite end. Around these sprocket wheels a double chain 94 passes as shown, the said chain being composed of two distinct chains 95 and 96 which are connected at intervals by transverse dog bars 97, as illustrated most clearly in Fig. 3. These dog bars 97 connect the dogs 98 of the chains in the manner illustrated in Fig. 6 and near its middle point each bar is provided with a notch or cut 99 in the edge thereof, which enables it to clear the dog 78 of the opposite chain. The side or run 100 of the double chain 94 is backed by guide pulleys 101 arranged on the inner sides of the chain, as indicated in Fig. 5.

The sprocket wheels 93 are rigidly attached to a shaft 102 as shown clearly in Figs. 1 and 2, and this shaft extends downwardly and is provided at its lower end with a rigid sprocket wheel 103 which can just be seen in Fig. 2 below chain 88. The lower end of the shaft 102 is rotatably mounted in the guide bar 20, while the upper end is rotatably mounted in a suitable bracket 104 attached to the upper frame 22. Around the sprocket wheel 103 there runs an endless sprocket chain 105, and this chain runs inwardly along the guide bar and passes around a sprocket wheel 106 which is rigid upon the driving shaft 107. This driving shaft 107 extends downwardly and passes rotatably through the shaft frame 55. The lower end of this shaft 107 is provided with a bevel gear 108 which meshes with a corresponding bevel gear 109 carried by the aforesaid countershaft 54. From this arrangement it should be understood that as the shaft 107 rotates, it drives continuously the double chain 94. In addition to this double chain 94, I provide an upper chain or top chain 110 having dogs 110[a]. This chain runs parallel with the lower chain, and is about half the length of the auxiliary guide bar 20. At one end it passes around a sprocket wheel 111 which is rigidly attached to the upper portion of the shaft 102, as indicated in Fig. 5. One part of this chain is guided along parallel with and above the inner run of the double chain 94, passing around a suitable sprocket wheel 112 at its right end, as shown. The rear run of the chain 110 passes around the body or drum 113 of a brush 114, which brush is mounted upon an upright shaft 115 and thus forms a guide for said chain, in addition to its other functions. The drum 113 is provided with a plurality of outwardly projecting beaters or arms 116, and the shaft 115 is continuously driven by means of a sprocket chain 117 which passes around a sprocket wheel 119 rigid on the shaft 115, and a sprocket wheel 118 rigid on the shaft 59 as indicated most clearly in Fig. 2. The brush 114 I call the first brush, as it operates on the sugar cane before the second brush 120, which is mounted on the opposite side of the guide opening through which the cane passes. As the shaft 115 is rotatably mounted in the auxiliary guide frame, so is the shaft 121 of the brush 120 similarly rotatably mounted in the main guide frame. The shaft 121 is driven by a sprocket chain 121[a] passing around a sprocket wheel 107[a] on the shaft 107, and around a sprocket wheel 121[b] on the shaft 121. The brushes are similarly constructed. Near the brushes, guide bars 122 and 123 are provided, which are slightly curved as shown, and pass between the arms or beaters of the brushes, as indicated. They present convex or outwardly curved guide edges, which permit of the stalks sliding along in contact with the brush, but they prevent the stalks from becoming caught therein.

Referring again to the shaft 59, and especially to Fig. 2, this shaft is provided with a sprocket wheel 124 which drives a sprocket chain 125, which extends around and drives a sprocket wheel 126 carried upon a knife shaft 127. The lower end of this knife shaft is rotatably mounted in the shaft frame 55, and it extends upwardly, as indicated most clearly in Fig. 3, the upper end being rotatably mounted in a suitable bearing 128. The upper portion of the shaft 127 is formed into an angular or square neck 129; on this neck 129 a knife carriage 130 is adapted to slide, the said knife carriage being provided with a knife 131, comprising a hub with oppositely projecting knives 132 formed thereupon. As indicated by the dotted lines in Fig. 3, the knife carriage 130 is provided with a sharpened cutting edge 133, and it should be understood that as the knife rotates, a shear or scissor action occurs at this edge 133, the forward edges of the blades 132 being sharpened, as will be readily understood.

Upon the upper part of the carriage 130, a guide bracket 134 is attached, the form of which is clearly shown in Fig. 3; it consists of a downwardly curved plate, the end of which is disposed near the extremity of the blades 132 as they rotate. On the inner face of the guide bracket 134 a spring 135 is attached, the said spring consisting of a long flat plate or bar which extends across the face of the first brush 114, as shown very clearly in Fig. 2. As indicated in Fig. 5, the free end of this spring or presser bar 135 projects inwardly toward the brush.

It should be understood that as the cane is fed into the space between the guide-frames, the upper ends of the stalks are cut off by the rotating knife. The knife carriage is intended to be raised or lowered so as to suit cane of different height. For this purpose, the bracket is mounted so as to slide on the neck 129, and it is supported in any position by means of a cord 136, which passes down over a guide-pulley 137 attached to the bar 22. From the point of attachment of the pulley 137, an inclined brace 138 extends downwardly, and this brace is provided with a drum 139, about which the cord 136 may wrap, as indicated. The drum 139 is adapted to be rotated by a crank 140, the handle of which is provided with a sliding sleeve 141. This sleeve has a projecting sleeve 142 (see Fig. 1), which is adapted to engage with the inclined brace 138 to lock the drum against rotation by the tension in the cord 136. These parts are also illustrated in Fig. 5, where it will be observed that the drum 139 is suitably mounted in a bracket 143 attached to the brace.

As indicated in Figs. 4 and 5, the auxiliary frame is provided with a presser bar or spring 144, which is curved as shown in Fig. 5, and projects over near the face of the second brush 120. From this arrangement the cane after coming from the first brush 114, is passed over and across the face of the second brush. In this way the brushes operate to remove the leaves from the stalks.

Referring again to Fig. 2, it will be observed that the knife carriage 130 is guided at its ends upon the guide bars 145, which are arranged parallel to each other, their upper ends being attached to the bar 22, and their lower ends to the auxiliary guide bar 20.

The mode of operation of the entire mechanism will now be described. The machine is advanced through the standing cane in such a way that the cutters or disks 40 present themselves to the row of cane. If the cane should have fallen down, the extension 69 on the forward end of the main guide bar 15 operates to raise the cane so as to enable the stalks to be cut off as described. As the stalks are cut off, they pass rearwardly into the guide space between the guide frames, and are advanced along the same by the chains 77 and 94. As the stalks advance in this way, their upper ends come under the guide bracket 134 and are cut off by the rotary knife 131. After this the stalks are advanced past the first brush 114 against which the presser or spring 135 holds them. Beyond this point, they advance and are forced over against the second brush, where the brushing operation is repeated. In this way the brushes operate effectively to remove the leaves from the cane. The guard bars 122 and 123 operate effectively to present the cane from becoming entangled in the beaters of the brushes. After leaving the second brush 120, the cane passes toward the rear of the guide frames, and eventually passes out of engagement with the chains, and then falls to the ground or into a wagon for treatment in the cane mill.

Special attention is called to the guide channel or chute 24, which receives the lower ends of the stalks immediately after they are cut off. This channel supports the lower ends of the stalks in their complete movement through the machine, and assists in guiding the stalks to the brushes. The chains 77 and 94 above, also grasp the stalks and drag the lower ends of the cane up into the channel. Special attention is called, also, to the spring arms 80 (Fig. 5) which yieldingly holds the stalks of cane in position as they pass through the machine. In this way the chain 77 which runs over the arms, can move backwardly so as to accommodate unusually large bundles or bunches of the stalks as they advance.

Referring especially to Fig. 1, attention is called to the arrangement of the forward end of the double chain 94, and especially to the run of the chain between the pulleys 91 and 92. This run of the chain forms a large angle or V with the forward end of the chain 77, which operates as a guide so as to bring the stalks into the space between the guide frames.

Where the expression "diagonally thereof" is used herein with reference to the stripping mechanism, it is meant in the sense that the axis of the stalk and the axis of the stripper are inclined to each other at an appreciable angle at the instant of stripping. This causes a much more efficient and uniform stripping action than can be obtained when the stripping brushes are arranged with their axes substantially at right angles to the axes of the stalks.

Having thus described my invention, I claim as new and desire to secure by Letters Patent:

1. In a machine of the character described, in combination, a frame, guide frames forming a space therebetween through which the cane stalks may pass in a standing position, means for advancing cut stalks between said guide frames, a rotatable topping knife, a vertically adjustable carriage carrying said knife and mounted within one of the guide frames, vertically disposed brushes mounted in the guide frames in the rear of said knife, guide bars for guiding the stalks from one brush to another, and a guide bar carried by said knife carriage and arranged to guide the stalks in their passage by the knife and from the knife to the first stripping brush in the rear of the knife.

2. In a harvester, in combination, a frame, guide frames forming between them, a stalk channel, means for advancing cut stalks rearwardly in the channel, a knife carriage vertically adjustably mounted in one of the said guide frames, a rotating blade carried by said carriage, a stripping roller supported in one of the guide frames in the rear of said knife carriage, a bracket mounted in said knife carriage and having a portion curved outwardly and terminating slightly beyond the outer edge of the rotating blade, and a presser bar secured to said curved bracket portion and having one end extending rearwardly to the said stripping brush.

3. In a harvester, in combination, a frame, a guide frame mounted thereupon, means for advancing cane stalks along said frame, a rotatable shaft mounted in said guide frame, a knife carriage movably mounted on said guide frame, a knife carried by said carriage and having a splined connection with said shaft, and a crank mounted in the frame and having connection with the knife carriage whereby the knife may be adjusted vertically during the operation of the machine.

4. In a harvester, in combination, a frame, guide frames supported thereupon and disposed apart to form a space to receive the cane stalks, conveyer chains supported on said guide frames and adapted to advance the stalks of cane therebetween, a brush having bristles or teeth carried by one of said guide frames, a second brush of like character carried by the other of said guide frames, guard bars disposed across said brushes and through their said bristles or teeth, and means for pressing the stalks against said guard bars as they pass.

5. In a harvester, in combination, a frame, a guide frame mounted thereon, means for advancing cut stalks along the latter frame, a rotatable upright shaft mounted in said frames, a knife carriage movable on said shaft, a horizontally circular knife in said carriage and splined upon said shaft, a hand operated drum mounted on the frame, and a flexible connection between said drum and said carriage for adjusting the knife vertically.

6. In a harvester, in combination, a frame, means forming a stalk channel in the frame and for advancing cut stalks rearwardly in the channel, and including spaced guide frames, a rotating knife supported by one of said guide frames for topping the stalks, a stripping brush also supported by one of said guide frames and disposed in the rear of said topping cutter, a bracket plate opposite the topping knife and adapted to guide the stalks from said knife to the said brush, a second stripping brush supported by the guide frame upon the opposite side of the channel to, and in the rear of, said first stripping brush, and a presser bar extending angularly across the channel for guiding the stalks from the first stripping brush to the second brush.

7. In a cane stripper, a conveyer for the cane inclined upwardly and rearwardly, means for supplying the cane to said conveyer, and rotary stripping means adjacent to said conveyer and having its axis inclined forwardly of the machine.

8. In a cane stripper, a conveyer for the severed stalks, and stripping means angularly disposed with reference to the cane presented thereto for stripping the same progressively from top to bottom.

9. In a cane stripper, a conveyer for holding the severed stalks during stripping and successive rotary strippers mounted on separate shafts and provided with flexible fingers or bristles and having their axes angularly disposed with reference to the cane presented thereto to successively strip the stalks diagonally thereof.

10. In a cane harvester, means for conveying the severed cane, and means for stripping the cane against the direction of movement thereof.

11. In a cane harvester, means for conveying the severed cane, and means for stripping the cane diagonally downward.

12. In a cane harvester, means for conveying the severed cane, and means for stripping the cane diagonally downward against the direction of movement thereof.

13. In a cane harvester, means for conveying the severed cane, and rotary brushes for stripping the cane downwardly.

14. In a cane harvester, means for conveying the severed cane, and means positioned entirely above said conveying means for stripping the cane while conveyed by said conveying means.

15. In a cane harvester, conveying means for gripping and firmly gripping the severed cane intermediate the ends thereof, and means for stripping the cane only above the point at which it is gripped by said conveying means.

16. In a cane harvester, means for firmly gripping and conveying the severed cane, and brushes for stripping the conveyed cane.

17. In a cane harvester, endless traveling members for firmly gripping and conveying the severed cane, and brushes for stripping the conveyed cane.

18. In a cane harvester, means for yieldingly but firmly gripping and conveying the severed cane, and means for stripping the conveyed cane.

19. In a cane harvester, means for conveying the severed cane rearwardly, and forwardly moving means acting at each side of the path of travel of the cane for stripping the cane.

20. In a cane harvester, means for conveying the severed cane rearwardly, and forwardly rotating brushes acting at each side of the path of travel of the cane for stripping the cane.

21. In a cane harvester, means for gripping and conveying the severed cane, and means for supporting the lower ends of the conveyed cane.

22. In a cane harvester, means for gripping and conveying the cane comprising endless chains engaging the cane on opposite sides and arranged to exert a yielding gripping pressure on the cane, and supporting means for the cane butts extending under and substantially parallel with the chains.

23. In a cane harvester, means for conveying the severed cane, means for supporting the lower ends of the conveyed cane, and means for stripping the conveyed and supported cane.

24. In a cane harvester, means for conveying the severed cane, means for supporting the lower ends of the conveyed cane, and means for topping the conveyed and supported cane.

25. In a cane harvester, means for gripping the cane between its ends and conveying it through the machine, means for supporting the butts of the cane while being so conveyed, and means for topping the cane while so conveyed and supported.

26. In a cane harvester, means for gripping the cane between its ends and conveying it through the machine, a butt support for the cane extending under the conveying means, and a rotary topping knife mounted above the conveying means and acting to top the cane while carried by the conveying means and with its butts supported by the butt support.

27. In a cane harvester, means for conveying the severed cane, means for supporting the lower ends of the conveyed cane, and means for topping and stripping the conveyed and supported cane.

28. In a cane harvester, conveying means gripping the cane between its ends, butt supporting means extending under the conveying means and supporting the butts of the cane while it is conveyed by the conveying means, and stripping brushes for stripping the upper parts of the cane, said butt supporting means serving to prevent tilting of the cane with respect to the conveying means while it is being stripped.

29. In a cane harvester, means for topping the severed cane, and means for stripping the cane after it has been topped.

30. In a cane harvester, means for cutting the cane, means for topping the cane after it has been cut, and means for stripping the cane after it has been topped.

31. In a cane harvester, means for conveying the severed cane, and means for successively topping and stripping the conveyed cane.

32. In a cane harvester, upwardly extending rotary brushes adapted to strip the cane, and means for rotating said brushes to cause a forward stripping movement.

33. In a cane harvester, forwardly and upwardly inclined rotary strippers having flexible bristles adapted to strip the cane, and means for rotating said strippers to cause a forward stripping movement of said bristles.

34. In a cane harvester, rearwardly moving means for conveying the severed cane, and forwardly moving means for stripping the conveyed cane, acting upon each side of the cane.

35. In a cane harvester, rearwardly and upwardly moving means for conveying the severed cane, and forwardly and downwardly moving means for stripping the conveyed cane.

36. In a cane harvester, a rearwardly extending conveyor for gripping and conveying the severed cane, and rotary means for stripping the conveyed cane, the axis of rotation of said stripping means being at an angle with the plane of movement of said conveyor.

37. In a cane harvester, means for conveying the severed cane, and means for supporting and guiding the lower ends of the conveyed cane.

38. In a cane harvester, means for gripping the cane and conveying it through the machine, and a rotary topper having an outwardly projecting blade for striking off the tops of the cane as it is conveyed past the topper.

39. In a cane harvester, means for gripping and conveying the cane comprising a pair of endless chains engaging the cane on one side and a chain engaging the opposite side of the cane between the two first named chains, said chains being arranged to exert a yielding gripping pressure on the cane, and topping means acting to top the cane while conveyed by the chains.

40. In a cane harvester, means for gripping and conveying the cane comprising a pair of endless chains engaging the cane on one side and a chain engaging the opposite side of the cane between the two first named chains, said chains being arranged to exert a yielding gripping pressure on the cane, and means for stripping the cane while so conveyed.

41. In a cane harvester, means for gripping and conveying the cane comprising a pair of endless chains engaging the cane on one side and a chain engaging the opposite side of the cane between the two first named chains, said chains being arranged to exert a yielding gripping pressure on the cane, and rotary stripping brushes located at each side of the path of travel of the cane for stripping the cane while so conveyed.

42. In a cane harvester, means for gripping and conveying the cane comprising a pair of endless chains engaging the cane on one side and a chain engaging the opposite side of the cane between the two first named chains, said chains being arranged to exert a yielding gripping pressure on the cane and being inclined upwardly and rearwardly so as to elevate the cane, and supporting means for the cane butts extending under and substantially parallel with the chains.

43. In a cane harvester, means for gripping and conveying the cane comprising a pair of endless chains engaging the cane on one side and a chain engaging the opposite side of the cane between the two first named chains, said chains being arranged to exert a yielding gripping pressure on the cane, supporting means extending under the conveyor chains for supporting the butts of the cane as it is conveyed through the machine by the conveying means, and means for stripping the cane diagonally downward against the direction of movement thereof while so conveyed and supported.

44. In a cane harvester, means for gripping and conveying the cane comprising endless chains engaging the cane on opposite sides thereof said chains being arranged to exert a yielding gripping pressure on the cane, a butt support extending below the conveyor chains, and rotary stripping brushes acting to strip the cane against the direction of movement thereof while it is conveyed through the machine by the chains with the butts of the cane supported on said supporting means.

In testimony whereof I hereunto affix my signature in the presence of two witnesses.

GEORGE D. LUCE.

Witnesses:

DANIEL JUMP,

J. A. LAUTENSCHLAEGER, Jr.